United States Patent
Sutton et al.

(10) Patent No.: US 9,500,561 B2
(45) Date of Patent: Nov. 22, 2016

(54) EMBEDDING FIBER OPTIC CABLES IN ROTORCRAFT COMPOSITES

(71) Applicant: Bell Helicopter Textron Inc., Fort Worth, TX (US)

(72) Inventors: Drew Sutton, Hurst, TX (US); Brian Tucker, Fort Worth, TX (US); Troy Schank, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 65 days.

(21) Appl. No.: 14/310,172

(22) Filed: Jun. 20, 2014

(65) Prior Publication Data
US 2015/0370030 A1 Dec. 24, 2015

(51) Int. Cl.
| | |
|---|---|
| *G02B 6/34* | (2006.01) |
| *G01M 11/08* | (2006.01) |
| *G02B 6/00* | (2006.01) |
| *B64C 27/00* | (2006.01) |
| *B64C 27/33* | (2006.01) |
| *G01D 5/353* | (2006.01) |
| *G02B 6/12* | (2006.01) |
| *B64D 45/00* | (2006.01) |

(52) U.S. Cl.
CPC .......... *G01M 11/086* (2013.01); *B64C 27/007* (2013.01); *B64C 27/33* (2013.01); *G02B 6/00* (2013.01); *B64D 2045/0085* (2013.01); *G01D 5/3537* (2013.01); *G01D 5/35374* (2013.01); *G02B 2006/12138* (2013.01); *Y10T 156/1002* (2015.01)

(58) Field of Classification Search
None
See application file for complete search history.

(56) References Cited

U.S. PATENT DOCUMENTS

| | | | | |
|---|---|---|---|---|
| 3,910,105 A | * | 10/1975 | Hoffstedt | G01N 21/88 116/DIG. 5 |
| 4,836,030 A | * | 6/1989 | Martin | G01M 11/086 73/800 |
| 4,840,480 A | * | 6/1989 | Starke et al. | G01M 11/086 356/32 |
| 4,888,076 A | * | 12/1989 | Martin | B29C 70/865 156/245 |
| 4,936,649 A | | 6/1990 | Lymer et al. | |
| 5,015,842 A | | 5/1991 | Fradenburgh et al. | |
| 5,142,141 A | | 8/1992 | Talat et al. | |
| 5,299,273 A | * | 3/1994 | Evans | G01M 11/086 385/12 |
| 5,399,854 A | * | 3/1995 | Dunphy et al. | G01K 5/72 250/227.14 |
| 5,568,582 A | * | 10/1996 | Rajic et al. | G02B 6/3803 385/901 |

(Continued)

OTHER PUBLICATIONS

Andrews, J., Augustin, M., "Advanced CBM Technologies for Helicopter Rotor Systems—Full Scale Rotor Demonstration and Test Results", Presented at the American Helicopter Society 66th Annual Forum, Phoenix, Arizona, USA, May 11-13, 2010.

(Continued)

*Primary Examiner* — Mike Stahl

(57) ABSTRACT

Some examples of techniques to cost-effectively embed fiber optic cables in laminate structures and to terminate the fiber optic cables on the surface of the laminate for robust and easily-repairable connections can be implemented in rotorcraft composites. To position a cable in the rotorcraft composite, a length of a fiber optic cable is embedded between layers of a composite rotorcraft material. The length of the fiber optic cable is oriented in a substantially S-shape between the layers. An end of the length of the substantially S-shaped fiber optic cable is extended to an edge of the composite rotorcraft material. The end of the length of the substantially S-shaped fiber optic cable is terminated at the edge of the composite rotorcraft material in either a storage area or easily machinable embedded connection.

20 Claims, 6 Drawing Sheets

(56) References Cited

U.S. PATENT DOCUMENTS

| | | | |
|---|---|---|---|
| 6,035,084 A * | 3/2000 | Haake et al. ............ | G02B 6/32 385/131 |
| 6,061,902 A * | 5/2000 | Kalamkarov et al. ................... | H01B 15/005 29/33 M |
| 6,547,448 B2 * | 4/2003 | Johnson et al. ..... | G01M 11/086 385/55 |
| 6,840,683 B2 * | 1/2005 | Takeda et al. ........... | G02B 6/43 385/55 |
| 7,813,598 B2 * | 10/2010 | Mortensen et al. .... | F03D 11/00 385/12 |
| 2004/0074307 A1 * | 4/2004 | Tjin ........................ | G01L 1/246 73/800 |
| 2005/0259909 A1 | 11/2005 | Aldridge et al. | |
| 2007/0122098 A1 * | 5/2007 | Menendez .............. | B29C 73/26 385/134 |
| 2007/0160338 A1 * | 7/2007 | Mortensen et al. .... | F03D 11/00 385/134 |

OTHER PUBLICATIONS

Luyckx, G., Voet, E., Lammens, N., and Degrieck, J. "Strain Measurements of Composite Laminates with Embedded Fibre Bragg Gratings: Criticism and Opportunities for Research." Sensors 11, No. 1: 384-408, 2011, doi:10.3390/ s110100384.

Shivakumar, K., and Bhargava, A., "Mechanics of Failure of Composite Laminates with an Embedded Fiber Optic Sensor" Journal of Composite Materials vol. 39 No. 9 777-798, 2005, doi:10.1177/0021998305048156.

Keulen, C., Rocha, B., Yildiz, M., Suleman, A., "Embedded Fiber Optic Sensors for Monitoring Processing, Quality and Structural Health of Resin Transfer Molded Components" Journal of Physics Conference Series Jul. 2011; 305(1):012135, doi:10.1088/1742-6596/305/1/012135.

Udd, E., Winz, M., Kreger, S. and Heider, D., "Failure Mechanisms of Fiber Optic Sensors Placed in Composite Materials" Smart Structures and Materials 2005: Smart Sensor Technology and Measurement Systems, 409, 2005, doi:10.1117/12.603626.

FBGS-Embedded Fiber Optic Sensors for Monitoring Strain Within Composite Material; http://www.fbgs.com/referencesadv/be-en/1/detail/item/11/page/1/navigationcats/14 retrieved on Jun. 11, 2014, 2 pages.

Tucker, B. and Love A., Embedded Fiber Optic Sensors for High Strain Composite Components, SAE International, published on Sep. 17, 2013, 13 pages.

Insensys Intelligent Sensing Solutions powerpoint presentation, 30 pages.

Cerny, I., Jeronimidis, G., Hou, J., Mayer, R., Bruns, A., and Voet, E., "Verifying the Potential of Fibre Optic Sensors to Monitor Strains and Cracks in Fibre Composites" Presented at the 15th European Conference on Composite Materials, Venice, Italy, Jun. 24-28, 2012.

Lu et al;. Application Issues of Fiber Optic Sensors in Aircraft Structures; Fiber Optic Smart Structures and Skins IV, Proceedings SPIE—The International Society of Optical Engineering; Sep. 1991, Paper No. XP008030419; 7 pages.

Office Action issued in Canadian Application No. 2,894,905 on May 27, 2016, 4 pages.

* cited by examiner

EMBEDDING FIBER OPTIC CABLES IN ROTORCRAFT COMPOSITES

TECHNICAL FIELD

This disclosure relates to monitoring rotorcraft composites.

BACKGROUND

Rotor hubs made from thick composite flexures used on helicopters are subject to delamination failures which have strong correlation to the flapping (bending) excursions seen during operations. While these failure modes are benign, the flexure durability life varies with the aircraft usage. The ability to measure this usage (e.g., bending angle excursions) would allow for prediction of what remaining useful life until delamination initiation and enable improved logistical response. In some examples, fiber optic strain sensors can be mounted on a surface of a main rotor flexure to measure the loads in the flexure. Surface mounted sensors can be subjected to high values of strain. Although the sensors can be offset to experience a proportion of the total strain, the output of the sensors can be subject to crosstalk from other loading modes such as torsion. In addition, surface mounted sensors can be exposed to the environment and, consequently, potentially can be damaged.

SUMMARY

This disclosure relates to embedding fiber optic cables in rotorcraft composites.

Certain aspects of the subject matter described here can be implemented as a method of positioning a fiber optic cable. A portion of a length of a fiber optic cable is embedded between layers of a composite rotorcraft material. A portion of the length of the fiber optic cable is oriented in a substantially S-shape between the layers. An end of the portion of the length of the substantially S-shaped fiber optic cable is extended to an edge of the composite rotorcraft material. The end of the portion of the length of the substantially S-shaped fiber optic cable is terminated at the edge of the composite rotorcraft material.

This, and other aspects, can include one or more of the following features. The substantially S-shape is defined by a first concave portion and a second concave portion. A first direction of orientation of the first concave portion is opposite a second direction of orientation of the second concave portion. The first direction of orientation of the first concave portion tracks a circumference of an ellipse having a maximum radius and a minimum radius. A ratio of the maximum radius to the minimum radius is about 10:1. An angle by which the fiber optic cable turns along the second concave portion is less than or equal to about 7 degrees. With or without any of the preceding features, the portion of the length of the fiber optic cable can be oriented in a primary direction in which composite fibers of the composite rotorcraft material are oriented. With or without any of the preceding features, the composite rotorcraft material can include a primary portion and a secondary portion that protrudes from the primary portion. The edge of the fiber optic cable can lie in the secondary portion. With or without any of the preceding features, a sleeve can be positioned on the edge of the composite rotorcraft material. The sleeve can receive the end of the portion of the length of the substantially S-shaped fiber optic cable. To terminate the end of the portion of the length of the substantially S-shaped fiber optic cable at the edge of the composite rotorcraft material, the end of the portion of the length of the substantially S-shaped fiber optic cable can be positioned inside the sleeve. To position the sleeve to receive the end of the portion of the length of the substantially S-shaped fiber optic cable, the sleeve can be placed at the edge of the composite rotorcraft material when forming the composite rotorcraft material. A portion of the sleeve can extend out of the edge of the composite rotorcraft material. The composite rotorcraft material can be cured to secure the sleeve at the edge. The portion of the sleeve that extends out of the edge can be machined. With or without any of the preceding features, an axial length of the sleeve can be oriented in a primary direction in which composite fibers of the composite rotorcraft material are oriented. With or without any of the preceding features, a storage section of the composite rotorcraft material can be formed when forming the composite rotorcraft material. A coil of the fiber optic cable can be included in the storage section.

Certain aspects of the subject matter described here can be implemented as a composite rotorcraft material. The material includes a primary section including multiple composite fibers. The material includes a secondary section attached to a protruding from the primary section. The material includes a fiber optic cable embedded in part between layers of the primary section and in part between layers of the secondary section in a substantially S-shaped orientation. An end of the fiber optic cable terminates at an edge of the protruding section.

This, and other aspects, can include one or more of the following features. A length of the fiber optic cable embedded between the layers of the primary section can be oriented in a primary direction in which composite fibers of the primary section extend. A sleeve can be positioned on the edge of the secondary section. The sleeve can receive the end of the fiber optic cable. An alignment member can be positioned within the sleeve to align an external fiber optic cable inserted into the sleeve with the fiber optic cable positioned in the sleeve. A removable plug can be positioned between the edge of the secondary section and the end of the fiber optic sleeve positioned in the sleeve. The sleeve can include an inner casing and an outer casing.

Certain aspects of the subject matter described here can be implemented as a composite rotorcraft material. The material includes a primary section including multiple composite fibers. The material includes a secondary section attached to a protruding from the primary section. The material includes a sleeve positioned on an edge of the secondary section to receive an end of a fiber optic cable embedded in part between layers of the primary section and in part between layers of the secondary section in a substantially S-shaped orientation.

This, and other aspects, can include one or more of the following features. An alignment member can be positioned within the sleeve to align an external fiber optic cable inserted into the sleeve with the fiber optic cable positioned in the sleeve. A removable plug can be positioned between the edge of the secondary section and the end of the fiber optic sleeve positioned in the sleeve. The sleeve can include an inner casing and an outer casing.

Certain aspects of the subject matter described here can be implemented as a method of forming a composite rotorcraft material. A length of a fiber optic cable is embedded between layers of composite rotorcraft fibers on a ply boundary plane of the composite rotorcraft material. The length of the fiber optic cable is oriented to include a curvature on the ply boundary plane between the layers. An end of the length of the curved fiber optic cable is extended to an edge of the composite rotorcraft fibers, wherein the end of the length of the curved fiber optic cable terminates at the edge of the composite rotorcraft fibers. The layers of the composite rotorcraft fibers are cured.

This, and other aspects, can include one or more of the following features. The curvature can result in a substantially S-shaped fiber optic cable. Before curing the layers of the composite rotorcraft fibers, a sleeve can be positioned on the edge of the composite rotorcraft fibers. The sleeve can receive the end of the length of the substantially S-shaped fiber optic cable. The end of the length of the substantially S-shaped fiber optic cable can be positioned inside the sleeve. To position the sleeve to receive the end of the length of the substantially S-shaped fiber optic cable, the sleeve can be placed at the edge of the composite rotorcraft fibers. A portion of the sleeve can extend out of the edge of the composite rotorcraft material.

Certain aspects of the subject matter described here can be implemented as a method of forming a composite rotorcraft material. A length of a fiber optic cable is embedded between layers of composite rotorcraft fibers on a ply boundary plane of the composite rotorcraft material. A sleeve is positioned on the edge of the composite rotorcraft fibers. The sleeve receives an end of the length of the fiber optic cable that is extended to an edge of the composite rotorcraft fibers and terminates at the edge. The layers of the composite rotorcraft fibers are cured.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
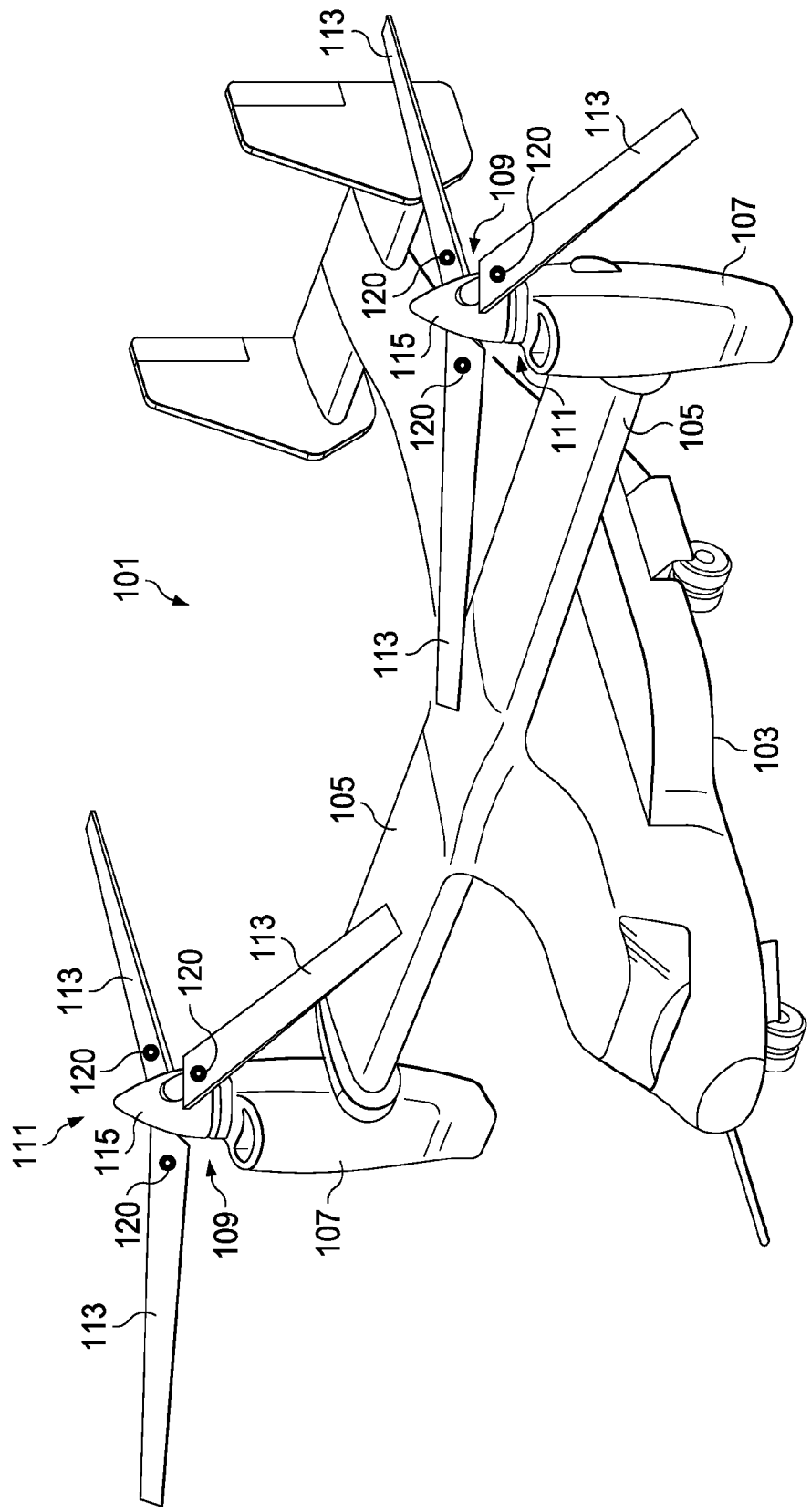
FIG. 1 is a schematic diagram showing an example of a tiltrotor aircraft.

This disclosure describes embedding fiber optic cables in rotorcraft composites, e.g., rotorcraft hubs. Helicopter rotors systems use flexible composite structures to provide controlled movement for rotor blades. These structures, such as rotor head flex beams, can experience very high surface strains, which can be in the order of 15,000µε. Helicopter rotor hubs incorporating the composite flexures are subjected to delamination failures which correlate to bending excursions. Measurement of this deflection can be used to predict the remaining useful life of the flexure and other hub components. However, the high surface strains can make it difficult for the rotorcraft composites to be monitored using surface bonded strain sensors. This disclosure describes embedding the fiber optic cables within the flex beam at a depth where the strain values are more suited to the range of the fiber optic sensing system. Embedding the fiber optic cables as described here can also protect the cables. Such rotorcraft composites embedded with fiber-optic sensors can be implemented as rotorcraft health and usage monitoring systems (HUMS).

Fiber optic sensors, e.g., fiber bragg gratings, are often better alternatives than traditional, embedded metal or semi conducting sensors because fiber optic sensors are capable of withstanding any processing that would destroy or irreparably damage the metal or semi conducting sensors during the cure cycle of thick composites. The fiber optic sensors can be implemented as fiber optic cables that are on the order of 10× the diameter of composite material fibers. This size correlation between the fiber optic cables and the composite material fibers is a function of the current art form, and to some extent the fragility of the fibers. The fragility can sometimes affect the termination of the embedded fiber optic cable on the external of the thick composite laminate. The embedded fiber optic cable is protected by the composite matrix inside the composite. However, at the point of termination, the fiber optic cable experiences a stiffness change accompanied by a change in vibration/loading environment. Because the single glass fiber is the structural connection between the sensor package and the fiber exiting the structure, fracture may result.

This disclosure describes techniques to terminate the fiber optic cable at an end surface of a rotorcraft composite. As described below, the fiber optic cable can be oriented in a gradual curve out of the laminate at a low stress/strain region. In addition, an end of the fiber optic cable can be terminated at the edge of the composite at an interface that decreases a possibility of the fiber optic cable fracturing at the edge of the composite. The techniques described here to embed fiber optic cables in rotorcraft composites can decrease the complexity of accurately locating the fiber optic cable during curing. The loads (e.g., shears, moments, or other loads) on the fiber optic cable at the edge of the rotorcraft composite can be decreased. Integrity of the highly polished embedded termination end of the fiber optic cable can be maintained throughout post processing. Intrusion of metal or reinforcing overwrap into the structural portion of the rotorcraft composite can be decreased or avoided. The techniques described here can be implemented as an easy, robust and cheap solution to terminating fiber optic sensors in rotorcraft composites. Implementing the techniques described here can additionally enable fastening a secondary, potentially removable or replaceable, mounting system without compromising the strength of the composite structure. In turn, this can allow N-number of connections, disconnections, maintenance and repair cycles with little to no adverse side effects to the composite structure.

FIG. 1 is a schematic diagram of an example tiltrotor aircraft 101. Aircraft 101 includes a fuselage 103 with attached wings 105. Nacelles 107 are carried at the outboard ends of wings 105 and are rotatable between the helicopter-mode position shown and a forward-facing airplane-mode position (not shown). Nacelles 107 carry engines and transmissions 109 for powering rotor systems 111 in rotation. An engine may be an internal combustion engine, an electrical power source and associated motor, or any other suitable means for powering rotor system 111. Each rotor system 111 is illustrated as having three blades 113. Spinning covers 115 and nacelles 107 substantially enclose transmission 109, obscuring transmission 109 from view in FIG. 1. The tiltrotor aircraft 101 can include CF bearing assemblies 120 as part of the coupling between each blade 113 and the rotor systems 111.

Figure 2:
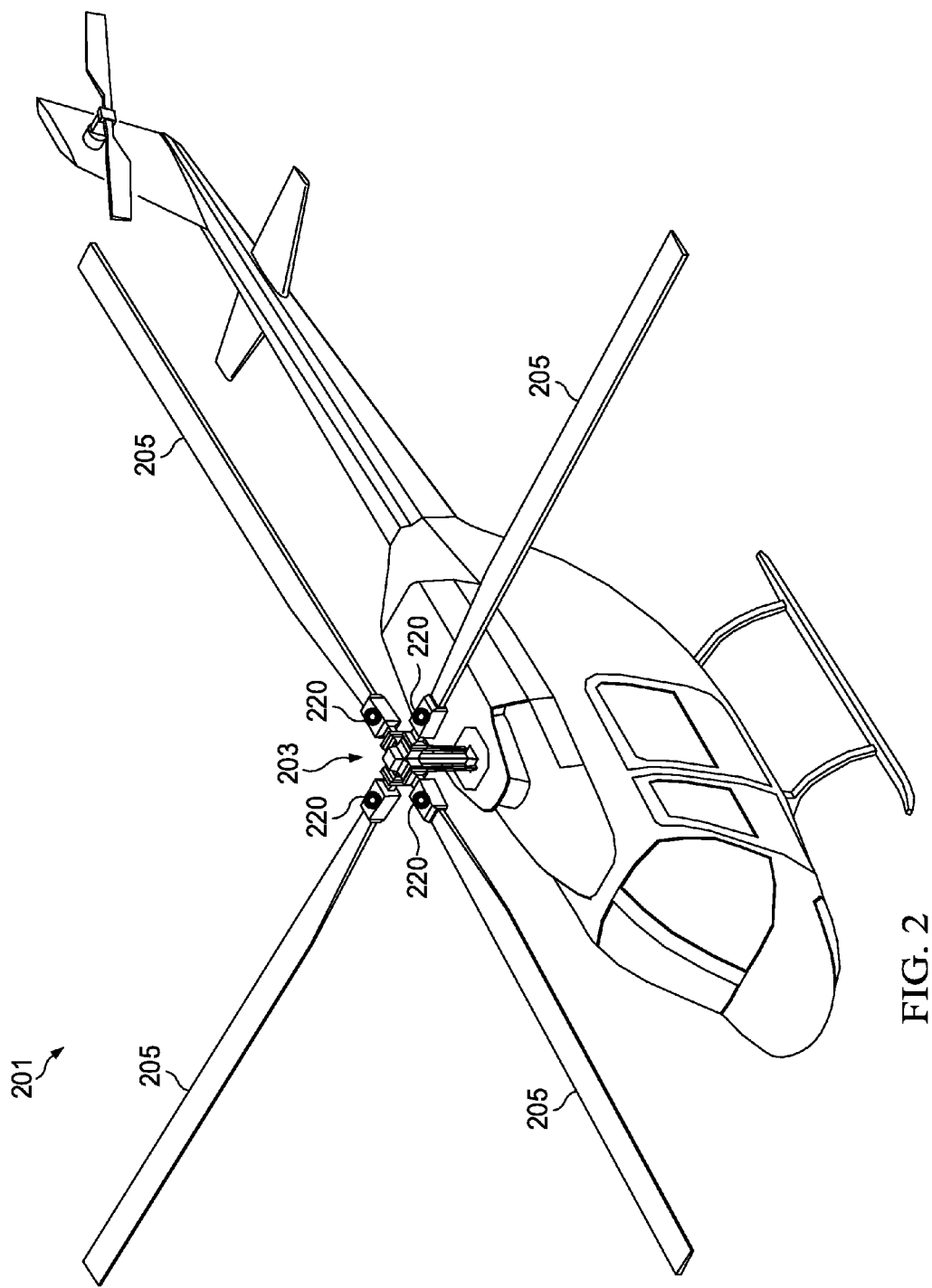
FIG. 2 is a schematic diagram showing an example of a rotorcraft.

FIG. 2 is a schematic diagram of an example rotorcraft 201. Rotorcraft 201 has a rotor system 203 with multiple rotor blades 205. The pitch of each rotor blade 205 can be manipulated in order to selectively control direction, thrust, and lift of rotorcraft 201. The rotorcraft 201 can include CF bearing assemblies 220 as part of the coupling between each blade 205 and the rotor system 203.

Figure 3:
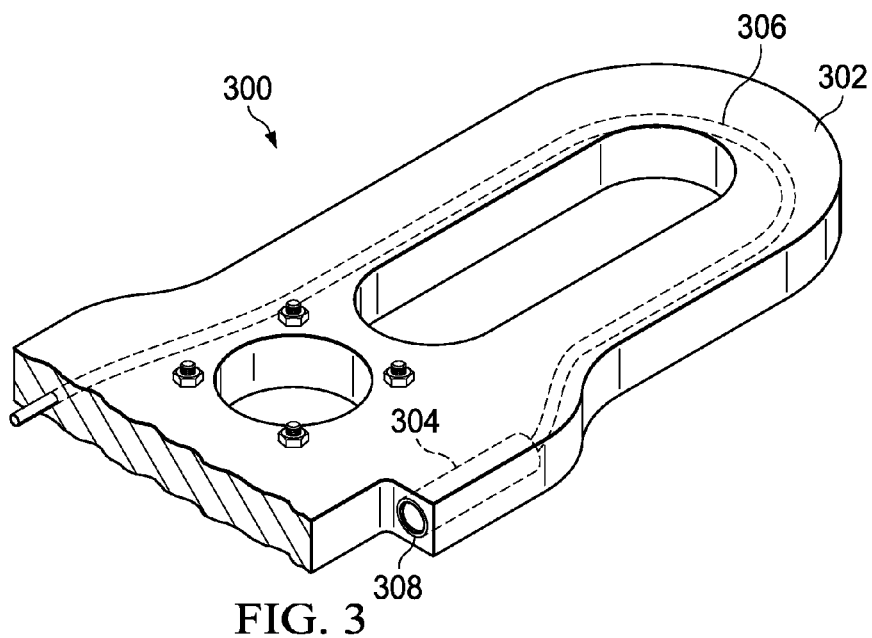
FIG. 3 is a schematic diagram showing an example of a rotorcraft yoke with an embedded fiber optic cable.

FIG. 3 is a schematic diagram showing an example of a rotorcraft yoke 300 (e.g., a flexure or a composite retention element) with an embedded fiber optic cable 306. The yoke 300 can include a primary section 302 which can include and/or be made of multiple composite fibers. The yoke 300 can also include a secondary section 304 attached to and protruding from the primary section 302. The primary section 302 can be a flexure region or a primary structure that can bear a substantial portion of the load on the yoke 300. The secondary section 304 can be a low strain structural attachment region which can bear a significantly smaller load relative to the primary section 302. The secondary section 304 can function as reinforcement for the termination of the fiber optic cable 306 and/or as an attachment point for an external system that includes a mating sensor and that can connect to the cable 306 to monitor the fiber optic cable 306. For example, the mating element can be a cable which ties to the monitoring unit, such as a fiber optic interrogator. In some implementations, an edge of the yoke 300 can be machined to produce the protruding secondary section 304. The fiber optic cable 306 can be embedded within and curve around the body of the yoke 300, e.g., between layers of the primary section 302 and between layers of the secondary section 304. A length of the fiber optic cable 306 embedded between the layers of the primary section 302 can be oriented in a primary direction in which composite fibers of the primary section 302 extend. The end of the fiber optic cable 306 can terminate at a termination point 308 in the secondary section 304 of the yoke 300.

Figure 4:
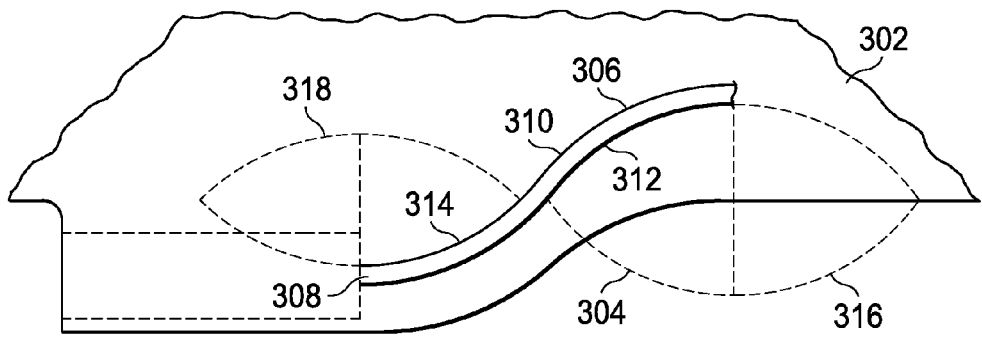
FIG. 4 is a schematic diagram showing an orientation of the embedded fiber optic cable in the yoke.

FIG. 4 is a schematic diagram showing an orientation of the embedded fiber optic cable 306 in the yoke 300, e.g., a pass through yoke, a race track yoke, or other yoke. Techniques described below can be implemented with reference to other rotorcraft composites, e.g., rotorcraft composites in which embedded fiber optic cables need to be turned to reach a termination point. Examples of other rotorcraft composites can include a dog bone Link or bolt joint configuration. Other examples can include stringers or ribs used in both rotorcraft and fixed wing airframe construction. Additional examples of rotorcraft composites can include rotor blades, airframe structures such as spars, longerons, intercostals, skins, or other structural elements such as cylindrical or conical load-bearing elements, composite lugs, composite beams, or other composite materials.

As shown in FIG. 4, the fiber optic cable 306 is embedded in the primary portion 302, transitions from the primary portion 302 to the secondary portion 304, and terminates at the termination point 308 at the edge of the yoke 300, specifically, in the secondary portion 304. In some implementations, the length of the fiber optic cable 306, e.g., a portion of the length that transitions from the primary portion 302 to the secondary portion 304 (length 310), is oriented to include a curvature on the ply boundary plane between the layers of the yoke 300. The curvature can allow the fiber optic cable 306 to gradually exit from the embedded location in the primary portion 302 toward the edge of the yoke 300 in the secondary portion 304 in a protected way that does not expose the structure or fiber to risk of failure initiation along the exit path or at the exit point. In some implementations, the portion of the length of the fiber optic cable 306 can be curved in a substantially S-shape, between the layers of the yoke 300. Alternatively, the curvature can have an L, C, U or any other shape. The curvature, e.g., the S-shape can minimize the wrinkling in the fiber optic cable 306 as the cable 306 runs across in the thick part of the yoke 300. The curvature can cause the fiber optic cable 306 to remain in the same ply boundary plane as the remainder of the fiber optic cable 306 that is embedded in the primary section 302 of the yoke 300.

For example, the substantially S-shape can be defined by a first concave portion 312 and a second concave portion 314. A direction of orientation of the first concave portion 312 can be opposite a second direction of orientation of the second concave portion 314. The first concave portion 312 and the second concave portion 314 can represent circumferential portions of a first ellipse 316 and a second ellipse 318, respectively. For example, the direction of orientation of the first concave portion 312 can track a circumference of the first ellipse 316. The direction of orientation of the second concave portion 314 can track the circumference of the second ellipse 318. The bend radius of each concave portion can be defined by a ratio of the maximum radius and the minimum radius of the respective ellipse. For example, a ratio of the maximum radius to the minimum radius for the first ellipse 316 can be high, e.g., greater than 5:1 such as approximately 10:1. In another example, an angle by which the fiber optic cable 306 turns along the second concave portion 316 can be small, e.g., less than or equal to approximately 7 degrees.

In general, the length 310 of the fiber optic cable 306 that transitions from the load bearing portion 302 to the non-load bearing portion 304 can be positioned in any orientation that decreases or eliminates an inter-laminar shear imparted to the fiber optic cable 36 by a sliding of two layers against one another. For example, a portion of the length 310 that transitions from the load bearing portion 302 to the non-load bearing portion 304 can be positioned with a gentle curve having a radius that is at least 100× the diameter of the fiber optic cable 306. Then, a portion of the length that traverses from the non-load bearing portion 304 to the termination point 308 can be positioned with an opposing gentle curve having a similar radius. In this manner, the fiber optic cable 306 can be positioned with a low bend radius relative to a 90 degree bend.

As described above, the length of the fiber optic cable 306 in the load bearing portion 302 can be oriented in a primary direction in which composite fibers of the yoke 300 are oriented. The length of the fiber optic cable 306 in the non-load bearing portion 304 and near the termination point 308 can also be oriented in the same direction as the primary direction. The substantially S-shaped orientation can minimize the shear stress on the fiber optic cable 306 as the cable 306 transitions from the load bearing portion 302 to the non-load bearing portion 304.

Figure 5A:
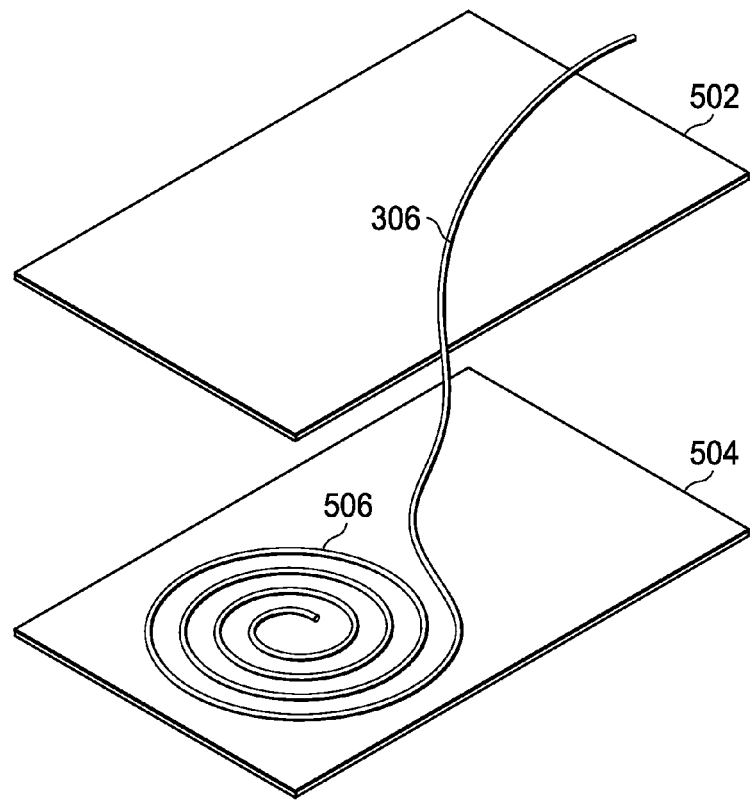
FIGS. 5A-5C are schematic diagrams showing a portion of the yoke that includes a coil of the fiber optic cable.
Figure 5B:
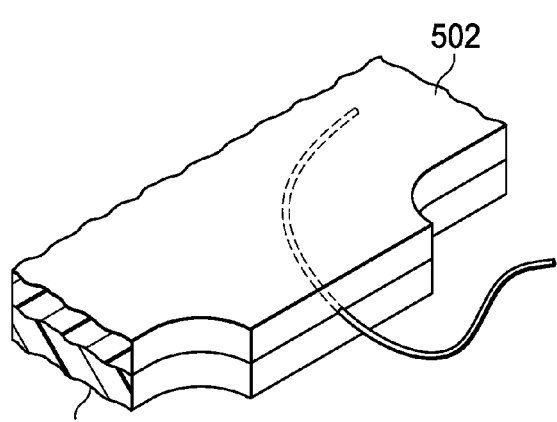
Figure 5C:
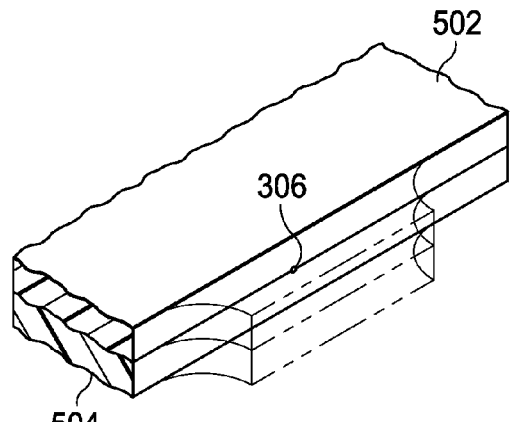

FIGS. 5A-5C are schematic diagrams showing a portion of the yoke that includes a coil of the fiber optic cable 306. In some implementations, the end of the length 310 of the substantially S-shaped fiber optic cable can be terminated at the edge of the yoke 300, e.g., at the termination point 308. Alternatively, an excess length of the fiber optic cable can placed in the yoke 300 for removal after curing the laminate. For example, FIG. 5A shows a schematic diagram of the yoke 300, in particular, the non-load bearing portion 304, including multiple layers (e.g., a first layer 502, a second layer 504, and/or other layers) of a plastic material, such as Tedlar® (offered by DuPont™, Inc.) or other type of plastic material. The two layers of the plastic material can be formed into a storage section of the yoke 300. A coil 506 of the fiber optic cable 306 can be included in the storage section. FIG. 5B shows a schematic diagram of machining the composite rotorcraft material and the plastic material to access the storage section. The plastic material can be a temporary fiber storage material in which the coil 506 is stored prior to curing the yoke 300. FIG. 5C shows a schematic diagram of accessing the coil 506 in the storage section. The composite rotorcraft material and the plastic material can be machined to access an end of the coil 506. In this manner, the coil 506 of the fiber optic cable 306 can be removed from the edge of the yoke 300. Including the coil 506 of the fiber optic cable 306 in the yoke 300 can negate having to embed the end of the fiber optic cable 306 in the termination point 308.

Figure 6A:
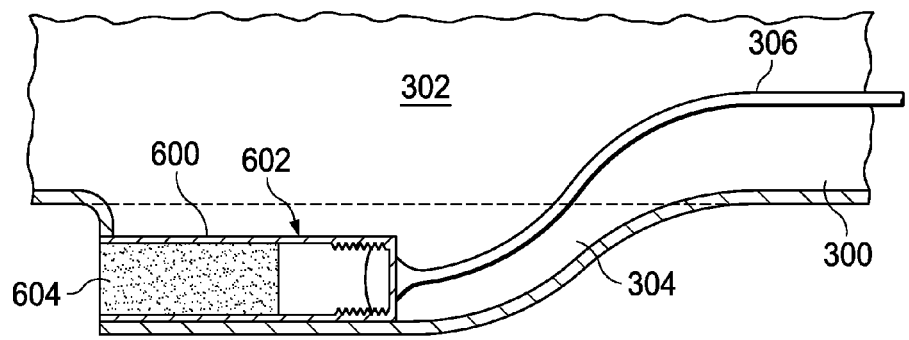
FIGS. 6A-6C are schematic diagrams showing an interface into which an end of the fiber optic cable is embedded.
Figure 6B:
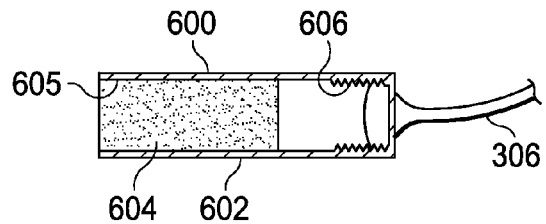
Figure 6C:
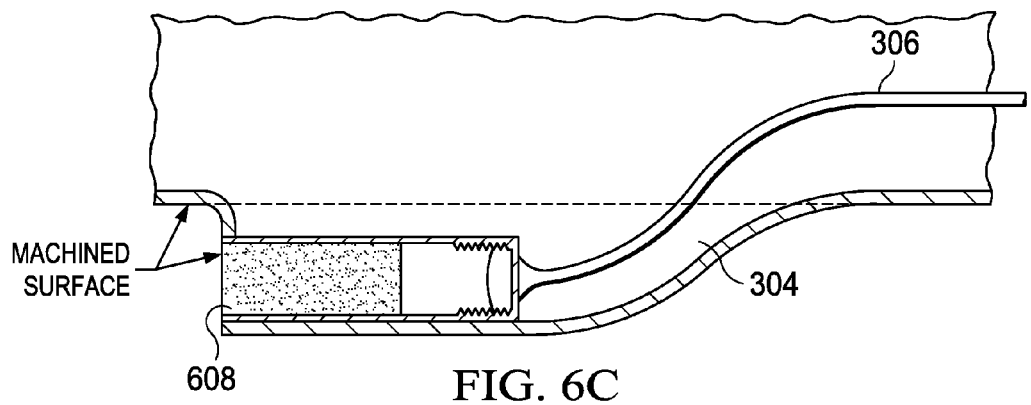

FIGS. 6A-6C are schematic diagrams showing an interface 600 into which an end of the fiber optic cable 306 is embedded. The interface 600 can be implemented to connect the end of the fiber optic cable 306 at the termination point 308 to an external monitor, e.g., of the HUMS. For example, the fiber optic cable can be connected to an external light source and an external spectrometer to read returning light and to determine strain from the information represented by the light. The interrogator can be part of the HUMS or a separate unit which itself can be in communication with the HUMS. FIG. 6A is a schematic diagram showing the interface 600 embedded in the yoke 300. The interface 600 can include a sleeve 602 positioned on the edge of the secondary section 304 of the yoke 300. When forming the yoke 300 and/or positioning the fiber optic cable 306 in the yoke 300, the sleeve 602 can be positioned at the edge of the secondary section 304 and the end of the fiber optic cable 306 can be positioned in the sleeve 602. In some implementations, a portion of the sleeve 602 can protrude into the secondary section 304 and a remainder of the sleeve 602 can protrude out of the secondary section 304. In this manner, the sleeve 602 can receive the end of the fiber optic cable 306.

FIGS. 6A and 6B are schematic diagrams showing a removable plug 604 positioned in the sleeve 602. The removable plug 604 can extend from a position within the non-load bearing portion 304 of the yoke 300 to a position that is external to the edge of the yoke 300. In other words, the removable plug 604 can be positioned on either side of the edge of the yoke 300. The end of the fiber optic cable 306 can abut against the end of the removable plug 604 that is inside the non-load bearing portion 304 of the yoke 300. The sleeve 602 can include one or more alignment members 606. For example, each alignment member can be a ridge formed on an inner casing 605 of the sleeve 602. Prior to curing, the fiber optic cable 306 can be inserted into the sleeve 602 such that the end of the fiber optic cable 306 contacts some of the alignment members when the fiber optic cable 306 is inserted into the sleeve 306. Subsequent to curing, the portion of the sleeve 602 that protrudes out of the secondary section 304 can be machined such that an outer edge of the sleeve 602 coincides with the edge of the yoke 300. Because a portion of the removable plug 604 is positioned on either side of the edge of the yoke 300, the sleeve 602 can be machined without affecting the end of the fiber optic cable 306.

FIG. 6C is a schematic diagram showing a machined surface of the yoke 300. Subsequent to curing the yoke 300 and machining the sleeve 602, the portion of the removable plug 604 in the yoke 300 can be removed to expose the end of the fiber optic cable 306 and adjacent connection. In some implementations, alignment members can be formed on the inner casing 605 between the end of the removable plug 604 and the end of the fiber optic cable 306. A fiber optic cable of a monitoring system can be inserted into the opening 608 formed by removing the machined plug 604. The alignment members formed in the inner casing 605 can align the fiber optic cable of the monitoring system with the end of the fiber optic cable 306. The sleeve 602 can utilize any commercially available or standardized connection type. In general, the sleeve 602 can be any structure that can be implemented as a machine-able removable plug that keeps the connection free from damage after the curing process.

Figure 7:
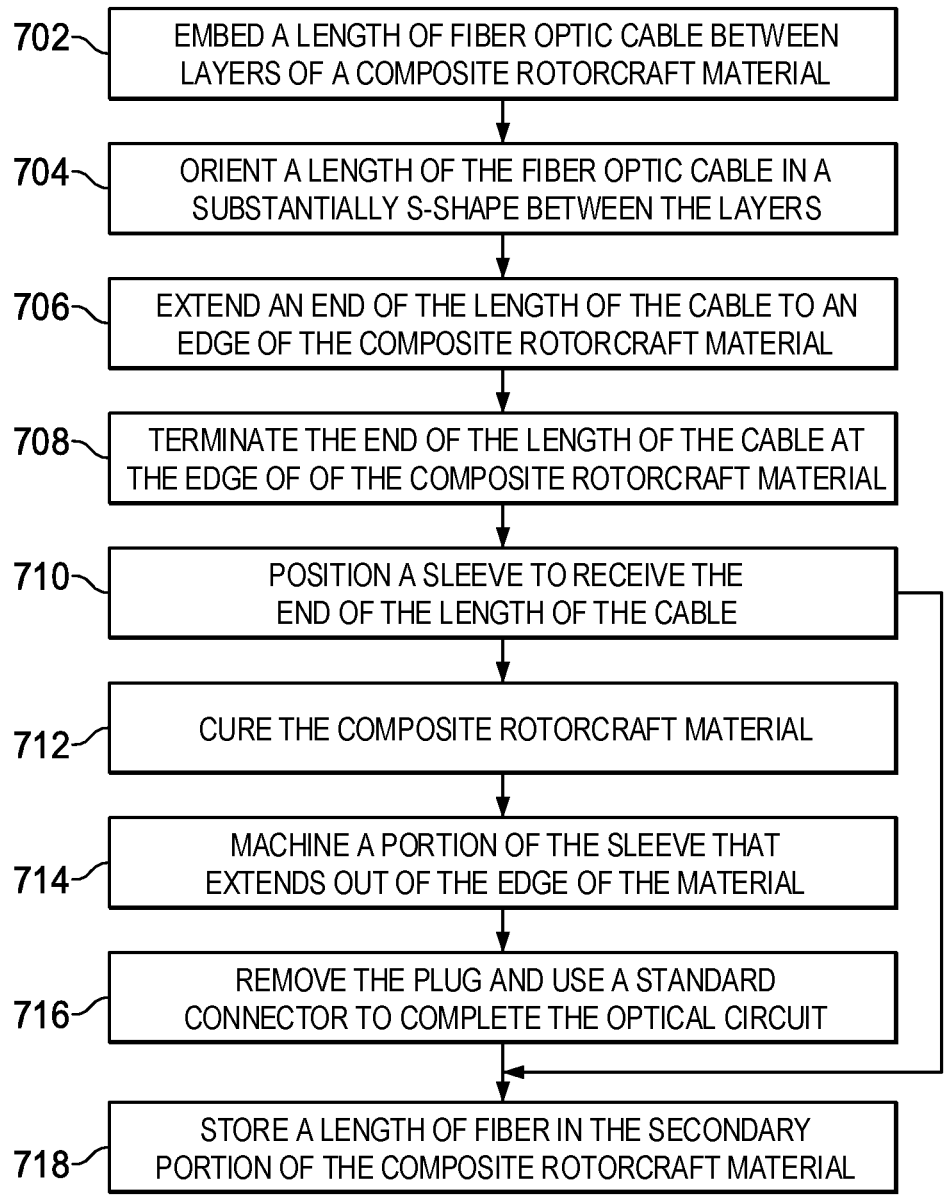
FIG. 7 is a flowchart of an example process for forming a composite rotorcraft material.

FIG. 7 is a flowchart of an example process 700 for forming a composite rotorcraft material. At 702, a length of a fiber optic cable is embedded between layers of composite rotorcraft fibers included in a composite rotorcraft material, e.g., a yoke. At 704, the length of the fiber optic cable is oriented in a substantially S-shape between the layers. At 706, an end of the length of the cable is extended to an edge of the composite rotorcraft fibers. At 708, the end of the length of the cable is terminated at the edge of the composite rotorcraft material. In some implementations, at 710, a sleeve is positioned to receive the end of the length of the cable. At 712, the layers of the composite rotorcraft fibers are cured. At 714, a portion of the sleeve that protrudes out of the edge of the composite rotorcraft material is machined. At 716, the plug can be removed and a standard connector used to complete the optical circuit. The external optical fiber that is connected to complete the optical circuit can be housed in a termination that affixes itself to the secondary section 304. The connector can be, e.g., a mechanical link, a clamped joint, a secondarily bonded joint, or any other type of connector.

In some implementations, a length of fiber can be stored in the secondary portion 304. At 718, the stored length of fiber can be retrieved and connected to an external fiber via a standard connection, e.g. a connector described above with reference to step 716. If the connection breaks, e.g., the connection is severed, additional stored fiber can be retrieved from the secondary portion 304 and the step 718 can be repeated. In such implementations, the external connection may be rigidly affixed to the secondary portion 304 similarly to the removable plug 604.

A number of implementations have been described. Nevertheless, it will be understood that various modifications may be made without departing from the spirit and scope of the disclosure.

What is claimed is:

1. A method of positioning a fiber optic cable, the method comprising:
   embedding a length of a fiber optic cable between layers of a composite rotorcraft material;
   orienting a portion of the length of the fiber optic cable in a substantially S-shape between the layers;
   extending an end of the portion of the length of the substantially S-shaped fiber optic cable to an edge of the composite rotorcraft material, wherein the substantially S-shape is defined by a first concave portion and a second concave portion, a first direction of orientation of the first concave portion is opposite a second direction of orientation of the second concave portion, and the first direction of orientation of the first concave portion substantially tracks a circumference of an ellipse having a maximum radius and a minimum radius; and terminating the end of the portion of the length of the substantially S-shaped fiber optic cable at the edge of the composite rotorcraft material.

2. The method of claim 1, wherein a ratio of the maximum radius to the minimum radius is about 10:1.

3. The method of claim 1, wherein an angle by which the fiber optic cable turns along the second concave portion is less than or equal to about 7 degrees.

4. The method of claim 1, further comprising orienting the portion of the length of the fiber optic cable in a primary direction in which composite fibers of the composite rotorcraft material are oriented.

5. The method of claim 1, wherein the composite rotorcraft material includes a primary portion and a secondary portion that protrudes from the primary portion, and wherein the end of the fiber optic cable lies in the secondary portion.

6. The method of claim 1, further comprising positioning, on the edge of the composite rotorcraft material, a sleeve to receive the end of the portion of the length of the substantially S-shaped fiber optic cable, wherein terminating the end of the portion of the length of the substantially S-shaped fiber optic cable at the edge of the composite rotorcraft material comprises positioning the end of the portion of the length of the substantially S-shaped fiber optic cable inside the sleeve.

7. The method of claim 6, wherein positioning the sleeve to receive the end of the portion of the length of the substantially S-shaped fiber optic cable comprises, when forming the composite rotorcraft material:
    placing the sleeve at the edge of the composite rotorcraft material, wherein a portion of the sleeve extends out of the edge of the composite rotorcraft material;
    curing the composite rotorcraft material to secure the sleeve at the edge; and
    machining the portion of the sleeve that extends out of the edge.

8. The method of claim 7, further comprising orienting an axial length of the sleeve in a primary direction in which composite fibers of the composite rotorcraft material are oriented.

9. The method of claim 1, further comprising, when forming the composite rotorcraft material:
    forming a storage section of the composite rotorcraft material; and
    including a coil of the fiber optic cable in the storage section.

10. A composite rotorcraft material comprising:
    a primary section including a plurality of composite fibers;
    a secondary section attached to and protruding from the primary section; and
    a fiber optic cable embedded in part between layers of the primary section and in part between layers of the secondary section in a substantially S-shaped orientation, wherein an end of the fiber optic cable terminates at an edge of the protruding section, wherein the substantially S-shape is defined by a first concave portion and a second concave portion, a first direction of orientation of the first concave portion is opposite a second direction of orientation of the second concave portion, and the first direction of orientation of the first concave portion substantially tracks a circumference of an ellipse having a maximum radius and a minimum radius.

11. The material of claim 10, wherein a length of the fiber optic cable embedded between the layers of the primary section is oriented in a primary direction in which composite fibers of the primary section extend.

12. The material of claim 10, further comprising a sleeve positioned on the edge of the secondary section, the sleeve to receive the end of the fiber optic cable.

13. The material of claim 12, further comprising an alignment member positioned within the sleeve to align an external fiber optic cable inserted into the sleeve with the fiber optic cable positioned in the sleeve.

14. The material of claim 12, further comprising a removable plug positioned between the edge of the secondary section and the end of the fiber optic cable positioned in the sleeve.

15. The material of claim 12, wherein the sleeve includes an inner casing and an outer casing.

16. A method of positioning a fiber optic cable, the method comprising:
    embedding a length of a fiber optic cable between layers of a composite rotorcraft material;
    orienting a portion of the length of the fiber optic cable in a substantially S-shape between the layers;
    extending an end of the portion of the length of the substantially S-shaped fiber optic cable to an edge of the composite rotorcraft material, wherein the substantially S-shape is defined by a first concave portion and a second concave portion, a first direction of orientation of the first concave portion is opposite a second direction of orientation of the second concave portion, and an angle by which the fiber optic cable turns along the second concave portion is less than or equal to about 7 degrees; and
    terminating the end of the portion of the length of the substantially S-shaped fiber optic cable at the edge of the composite rotorcraft material.

17. The method of claim 16, further comprising orienting the portion of the length of the fiber optic cable in a primary direction in which composite fibers of the composite rotorcraft material are oriented.

18. The method of claim 16, wherein the composite rotorcraft material includes a primary portion and a secondary portion that protrudes from the primary portion, and wherein the end of the fiber optic cable lies in the secondary portion.

19. A composite rotorcraft material comprising:
    a primary section including a plurality of composite fibers;
    a secondary section attached to and protruding from the primary section; and
    a fiber optic cable embedded in part between layers of the primary section and in part between layers of the secondary section in a substantially S-shaped orientation, wherein an end of the fiber optic cable terminates at an edge of the protruding section, wherein the substantially S-shape is defined by a first concave portion and a second concave portion, a first direction of orientation of the first concave portion is opposite a second direction of orientation of the second concave portion, and an angle by which the fiber optic cable turns along the second concave portion is less than or equal to about 7 degrees.

20. The material of claim 19, wherein a length of the fiber optic cable embedded between the layers of the primary section is oriented in a primary direction in which composite fibers of the primary section extend.

* * * * *